United States Patent

Katz

[11] 3,992,082
[45] Nov. 16, 1976

[54] COMPOUND LIQUID CRYSTAL INDICATOR SCREEN

[75] Inventor: Helmut Katz, Munich, Germany

[73] Assignee: Siemens Aktiengesellschaft, Berlin & Munich, Germany

[22] Filed: Jan. 29, 1975

[21] Appl. No.: 545,108

[30] Foreign Application Priority Data
Jan. 29, 1974 Germany............................ 2404127

[52] U.S. Cl........................................ 350/160 LC
[51] Int. Cl.²............................................ G02F 1/28
[58] Field of Search............................. 350/160 LC

[56] References Cited
UNITED STATES PATENTS

| | | | |
|---|---|---|---|
| 3,612,654 | 10/1971 | Klein et al. | 350/160 LC |
| 3,661,444 | 5/1972 | Matthies | 350/160 LC |
| 3,675,988 | 7/1972 | Soref | 350/160 LC |
| 3,873,186 | 3/1975 | Ritchie | 350/160 LC |
| 3,881,808 | 5/1975 | Gurtler | 350/160 LC |

Primary Examiner—John K. Corbin
Assistant Examiner—Rolf Hille
Attorney, Agent, or Firm—Hill, Gross, Simpson, Van Santen, Steadman, Chiara & Simpson

[57] ABSTRACT

A compound liquid crystal indicator screen having at least two liquid crystal cells which are arranged in tandem directly behind one another in a direction of a light beam characterized by a pair of glass outer plate members with at least one very thin transparent carrier foil member, a plurality of strip elements spacing the members to form a stack of spaced members and a glass solder sealing the periphery or marginal edges of the members to provide a plurality of spaced chambers with adjacent chambers being separated by the foil member and each chamber containing a liquid crystal layer to form one of the liquid crystal cells. Each of the foil members has a transparent electrode pattern disposed on each opposite surface which patterns are aligned with each other and each pattern has at least one lead extending to a margin of the foil and each of the plate members has a conductive layer on a surface facing the foil member with a lead extending to a margin of the plate member so that an electrical field could be selectively imposed on the liquid crystal layer of each cell to operate each cell independently of the other cells and simultaneously therewith. The strip elements are preferably of a U-shape having legs and are received with their legs engaging opposite surfaces of each of the plate members with selected strip elements contacting leads of the electrode patterns of the foil member to enable applying the electrical current to the cells.

10 Claims, 2 Drawing Figures

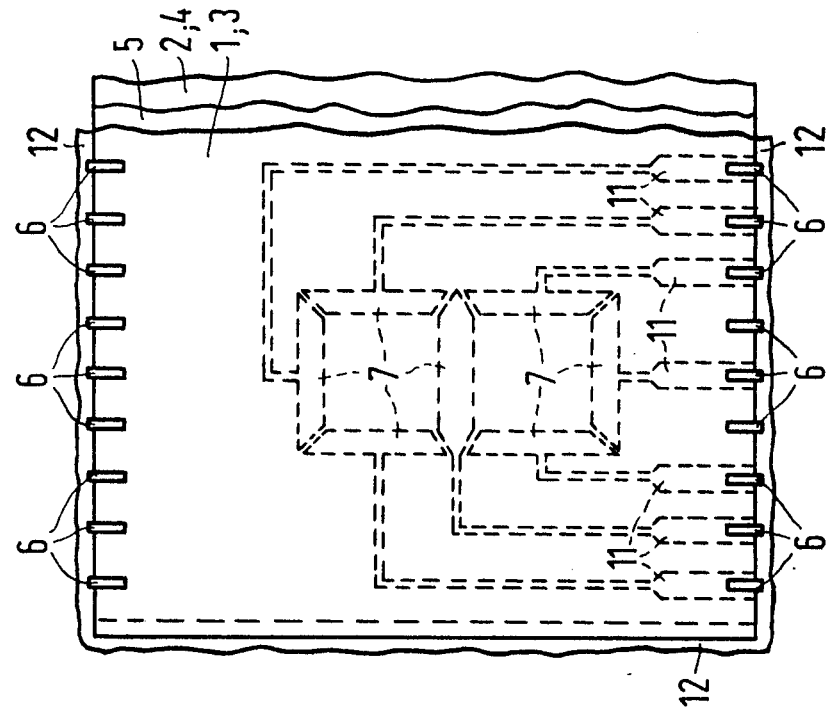
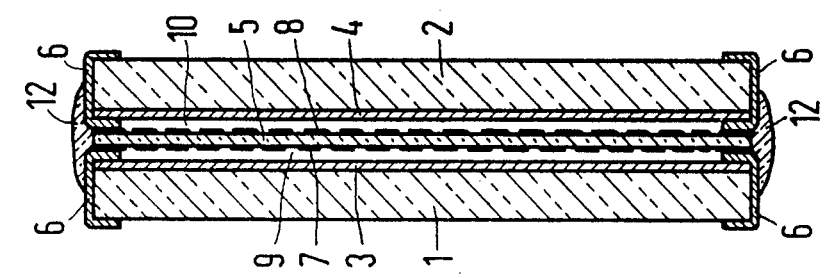

COMPOUND LIQUID CRYSTAL INDICATOR SCREEN

BACKGROUND OF THE INVENTION

The present invention relates to a compound liquid crystal indicator screen having at least two liquid crystal cells arranged in tandem directly behind one another in a liquid beam direction and which cells are either simultaneously or independently operated.

The invention is of particular importance for all liquid crystal indicator screens, which are to be visually observed such as displays, picture screens and similar things, and which screens have at least two liquid crystal cells in a tandem arrangement one behind the other. The invention enables obtaining a freedom from parallax for these screens, especially for screens in which the electrodes of each of the cells are in alignment. In such a screen, the cells may be controlled to operate simultaneously or independent of each other. The invention is also important for an indicator screen which has a multi-color indication.

To increase the contrast which is to be obtained, it is known in the art, for instance in the German Offenlegungsschrift 2,059,427 to arrange at least two liquid crystal cells behind one another in such a way that the electrodes are aligned with one another and that the light passes through both cells successively. To obtain this arrangement, it is suggested that the two liquid crystal cells are in a common construction.

Since the time period for switch over of the material of a cell between a light conducting state and a transparent state is approximately proportional to the square of the thickness of the liquid crystal layer of the cell and the thickness of this cell determines the light dispersion ability, a construction of two cells one behind the other enables obtaining the desired light dispersion ability without an increase in the switch-over time. Thus, depending upon the construction and the embodiment of liquid crystal cell, a so-called tandem arrangement provides either a multi-color effect, a movement effect, or in the case of single color operation, an essential increase of the contrast without increasing the switching time.

In a proposed practical embodiment for a tandem arrangement embodiment, a normal glass plate, which is provided with aligned electrode patterns, is used to separate the two liquid crystal layers and a light beam which is a bundle of parallel beams is utilized. A light-sensitive recording carrier, such as a film, is exposed by the parallel beams which are modulated as they pass through the two liquid crystal cells. The recordation carrier or film is moved directly along a surface of one of the outer glass plates of the cell and the bundle of parallel beams is directed through the opposite or other outer glass plate substantially perpendicular thereto.

If the proposed embodiment were used with indicator devices which do not operated with bundles of parallel beams but utilize ambient light conditions, it has an essential drawback. This drawback is based on the interfering parallax which is produced due to the thickness of the common center glass plate which separates the liquid crystal cells which are arranged directly one behind the other.

SUMMARY OF THE INVENTION

The present invention is directed to a task to avoid the essential drawbacks of previously proposed liquid crystal compound indicator screens and to provide a construction which is easier to realize. To accomplish this task, the invention utilizes a compound indicator screen having at least two liquid crystal cells arranged in tandem directly behind one another in the direction of the light beam. The screen comprises a pair of outer glass plate members with at least one very thin transparent carrier foil member disposed therebetween, means for spacing the members to form a stack of spaced members, and means sealing the margin of the members to provide a plurality of spaced chambers with adjacent chambers being separated by the foil member and each chamber containing a liquid crystal layer to form one of the liquid crystal cells. Each of the foil members has a pair of transparent electrode patterns disposed on opposite surfaces and aligned with each other, each of the electrode patterns has at least one lead extending to the margin of the foil member and each of the plate members has a conductive layer on a surface facing the foil member with at least one layer being transparent and with each layer having a lead extending to a margin of the plate member so that an electrical field can be selectively imposed on the liquid crystal layer of each cell to operate each cell both independently of the other cell and simultaneous therewith.

Preferably, the carrier foil member is of a material selected from a group consisting of glass, mica or the like and the foil has a thickness no greater than 500 $\mu$m.

The spacing of the member is preferably accomplished by utilizing a plurality of narrow sheet or strip elements having a U-shaped configuration with a pair of legs. The sheet elements which have a thickness in the order of only several 10 $\mu$m are received on the margins of the outer plate member with the legs engaging opposite surfaces. In positioning the sheet or strip elements, they are spaced to be at points so that a sheet element has a leg engaging each of the leads of the electrode pattern to provide means for applying electrical current separately to each of the leads. The strip element may advantageously be a soft-glass solder alloy consisting essentially of iron and nickel so that during assembly a dense fusion connection is made with the glass plate members and the sealing means which is preferably a glass solder. This will provide both a very exact spacing of the carrier foil member by the spacing means which are secured in position and enables the elements to be used as plug contacts for applying a current to the electrodes.

In order to increase the operation safety, the strip element may advantageously be provided with a coating of a ductile metal selected from a group consisting of gold and tin on the surfaces which are turned towards or engage the leads and also on their outer surfaces to improve their conducting properties.

The screen of the present invention can be utilized in a light passing mode in which case both the conductive layers on the outer glass plates are transparent. If used in a reflecting mode, then one of the conducting coating is a reflecting layer for reflecting the light back through the screen.

BRIEF DESCRIPTION OF THE DRAWINGS

FIG. 1 is a cross-sectional view of an indicator screen in accordance with the present invention and FIG. 2 is a partial plan view of the indicator screen of FIG. 1.

DESCRIPTION OF THE PREFERRED EMBODIMENT

The principles of the present invention are particularly useful when utilized in an indicator screen such as illustrated in FIGS. 1 and 2. The screen has a pair of outer glass plate members 1 and 2 and at least one very thin transparent carrier foil member 5 interposed therebetween. To space the plate members 1 and 2 with the interposed foil member 5 which is substantially thinner than the plate members 1 and 2, spacing means comprising a plurality of strip or sheet elements 6 are provided. The margins of the plates 1 and 2 along with the margin of the foil member 5 are sealed by sealing means such as a melted glass solder layer 12 to form a pair of separate chambers 9 and 10 which are separated from each other by the foil layer 5.

Each of the plate members 1 and 2 on a surface facing the foil member 5 are provided with a conductive layer 3 and 4, respectively. As illustrated, the layers 3 and 4 have at least a portion extending to the margin of their respective plate to form a lead therefor. The carrier foil member 5, which is of a material selected from a group comprising glass, mica or the like and has a thickness of 500 $\mu$m or less, is provided on one surface with an electrode pattern 7 and is provided on the opposite surface with an electrode pattern 8 which coincides and is aligned with the pattern 7. As illustrated in FIG. 2, the pattern 7 is a segmented electrode pattern having seven electrodes with each electrode having a separate conductive path or lead 11. As illustrated, the leads 11 extend to separate spaced points on the margin of the member 5. The electrode pattern 8 has similar leads for each of its electrodes, which leads may extend to the same margin or to an opposite edge or margin. If the leads of the pattern 8 extends to the same margin or edge as the leads 11, they may extend to spaced separate points or to coincidential points.

The sheet elements or strip elements 6 have a U-shape with legs and are received at spaced points on the margins of the sheets 1 and 2 with the legs engaging opposite surfaces of the plates. Preferably, the elements 6 have a thickness in the order of several 10 $\mu$m and correctly space the thin foil 5 from the plates 1 and 2 to determine the thickness of the chambers 9 and 10. As illustrated, some of the elements 6 while applied or engaged on the plates 1 and 2, respectively, contact portions of the leads 11 to enably applying voltages to the various segments of the electrode patterns such as 7 and 8. The particular elements 6 which are engaging the leads such as 11 are preferably insulated from the layers such as 3 or 4 either by application of an insulating layer thereon or by removing of the layer in the area of the element. Other elements may engage the layers 3 and 4 to provide means for applying electrical current or potential thereto.

Each of the chambers 9 and 10 receive a liquid crystal layer to form separate liquid crystal cells. By applying an electrical current or potential to selected strips 6, the liquid crystal layers in chambers 8 and 9 can be energized or operated either simultaneously or independent of each other.

To improve electrical conductivity to the leads, each of the strips 6 may be provided with a coating of a soft metal selected from a group comprising gold and tin on a leg contacting the leads such as 11 and on an outer surface. If desired, a projection may be provided on each of the strips 6 to enable connection to an electrical circuit. The strip 6 may consist of a soft-glass melting soldering consisting essentially of iron and nickel so that during melting of the glass solder 12 a good bond is provided between the plates 1 and 2, respectively, the sealing means 12 and the foil member 5.

To assemble the screen as illustrated in FIGS. 1 and 2, a plurality of the strip elements 6 are placed in a template which insures the exact spacing between the elements. One of the glass plates 1 or 2 is inserted in the template and is received between the legs of the positioned elements 6. It is advantageous but not required that the plate be provided with a thin coating of glass solder approximately along the center of the margin which receives the particular spaced elements 6. In a similar manner, the other glass plate is provided with the elements. After receiving the strip elements 6, the plates are heated in a furnace so that the strip elements 6 are fixed to the outer edges of the plates 1 and 2. If no glass solder was applied, the fixing depends purely on mechanical engagement. After providing each of the plates 1 and 2 with the plurality of strip elements 6, a carrier foil 5, which has been provided with the desired printed electrode patterns having segments and conductor paths or leads on each surface, is interposed between the two glass plate members 1 and 2 and positioned so that each of the leads is engaged by at least one leg of a separate element 6. If all of the leads extend to one margin or edge, then simple spacing elements similar to 6 are used on the other marginal edges of the plate members 1 and 2.

After alignment, the arrangement consisting of two outer plates 1 and 2 with the inserted carrier foil 5 has the sealing means such as glass solder applied along the margin and is then passed through a furnace to seal the margins of the members 1, 5 and 2 to form the two chambers 9 and 10. This sealing process leaves at least one opening to enable insertion of the liquid crystal layer into each of the separate chambers 9 and 10. Upon cooling, the tightly sealed chambers 9 and 10 are filled with the liquid crystal material to form the cells and the opening is then sealed in a conventional manner.

If the screen is to be used for transmitting light, both of the conductive layers 3 and 4 are transparent. However, if the screen is to be used in a reflecting mode in which light entering through the plate 1 is observed from the side of plate 1, then the layer 4 on the plate member 2 is provided as a reflecting layer to reflect the light passing through the cells contained in chambers 9 and 10 back out the one plate member 1. Even in a reflective mode of operation, the thinness of the foil member 5 will not result in any noticeable parallax in the light passing between the two cells.

It should be pointed out that when used in simultaneous operation, that the two cells provide an improved contrast but with shorter switch-over times than a single liquid crystal cell having the same contrast. If each of the cells formed by chambers 9 and 10 are operated independently of each other, a multi-color indication can be obtained.

Although various minor modifications may be suggested by those versed in the art, it should be understood that I wish to employ within the scope of the patent granted hereon, all such modifications as reasonably and properly come within the scope of my contribution to the art.

I claim:

1. A compound liquid crystal indicator screen having at least two liquid crystal cells arranged in tandem directly behind one another in the direction of a light beam, said screen comprising a pair of outer glass plate members with at least one very thin transparent carrier foil member disposed therebetween, each of said foil members being of a material selected from a group consisting of glass, mica and similar things and having a thickness substantially thinner than the plate members and no greater than 500 μm; means for spacing the members to form a stack of spaced members; and means consisting of glass solder for sealing the margins of the members to provide a plurality of spaced chambers with adjacent chambers being separated by a foil member, each chamber containing a liquid crystal layer to form one of the liquid crystal cells, each of said foil members having a pair of transparent electrode patterns disposed on opposite surfaces, each electrode pattern having at least one lead extending to the margin of the foil member and each of said plate members having a conductive layer on a surface facing the foil member with at least one layer being transparent with each layer having a lead extending to a margin of the plate member so that an electrical field can be selectively imposed on the liquid crystal layer of each cell to operate each cell both independently of the other cells and simultaneously therewith.

2. A compound liquid crystal indicator screen according to claim 1, wherein the means for spacing comprises a plurality of narrow sheet elements, each element having a U-shaped configuration with a pair of legs, each of said narrow sheet elements being extremely thin with a thickness of several 10 μm, said sheet elements being received on the margins of the outer plate members with the leg engaging opposite surfaces thereof.

3. A compound liquid crystal indicator screen according to claim 2, wherein the leads of the electrode patterns extend to separate points on the margin of the foil member and wherein the sheet elements are spaced along the margin of each plate member with each of the leads being engaged by a leg of a different sheet element to provide means for applying electrical current separately to each lead.

4. A compound liquid crystal indicator screen according to claim 3, wherein each of the sheet elements are provided on the surfaces engaging the leads of the electrode pattern and their outer surfaces with a ductile metal coating selected from a group consisting of gold and tin.

5. A compound liquid crystal indicator screen according to claim 3, wherein each of the sheet elements are provided with means forming a plug contact for connecting an electrical circuit thereto.

6. A compound liquid crystal indicator screen according to claim 2, wherein each of the electrode patterns on the foil member comprises a segmented electrode pattern having a plurality of electrode segments with each segment having a lead extending to one marginal edge of the carrier foil with the leads being spaced therealong and wherein the sheet elements disposed on the plate members adjacent the one edge of the foil member are spaced so that each of the leads is engaged by a leg of separate and distinct sheet elements.

7. A compound liquid crystal indicator screen according to claim 2, wherein each of the electrode patterns provided on the foil member are segmented electrode patterns comprising a plurality of electrode segments, with each segment having a separate lead, with the leads of one pattern extending to separate points on one edge of the carrier foil and the leads of the other pattern extending to spaced points along an opposite marginal edge, and wherein the sheet elements, which are disposed on the plate members adjacent the one edge and adjacent the opposite edge, are spaced therealong so that each of the leads of each pattern is engaged by a leg of a separate and distinct sheet element.

8. A compound liquid crystal indicator screen according to claim 2, wherein each of the sheet elements consist of a soft-glass solder alloy made essentially of iron and nickel so that during assembly, a dense fusion connection is made with the glass plate members and the sealing means.

9. A compound liquid crystal indicator screen according to claim 1, wherein one of the conductive layers disposed on one of the plate members is a reflecting layer so that the screen operates in a reflecting mode.

10. A compound liquid crystal indicator screen according to claim 1, wherein said pair of electrode patterns disposed on opposite surfaces of said foil member are aligned with each other.

* * * * *